United States Patent
Verbeck et al.

(10) Patent No.: US 7,609,902 B2
(45) Date of Patent: Oct. 27, 2009

(54) IMPLEMENTATION OF DISCRETE COSINE TRANSFORMATION AND ITS INVERSE ON PROGRAMMABLE GRAPHICS PROCESSOR

(75) Inventors: Channing Pierce Verbeck, Woodinville, WA (US); Craig Carroll Peeper, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 10/823,374

(22) Filed: Apr. 13, 2004

(65) Prior Publication Data

US 2005/0226520 A1 Oct. 13, 2005

(51) Int. Cl.
G06K 9/46 (2006.01)
H04N 7/12 (2006.01)
H04N 11/02 (2006.01)
H04N 11/04 (2006.01)

(52) U.S. Cl. ............... 382/250; 382/248; 375/240.2

(58) Field of Classification Search ............. 382/248, 382/250, 254, 274, 276; 375/240.2
See application file for complete search history.

(56) References Cited

U.S. PATENT DOCUMENTS

| | | | | |
|---|---|---|---|---|
| 5,073,820 A * | 12/1991 | Nakagawa et al. | ..... | 375/240.03 |
| 5,168,375 A * | 12/1992 | Reisch et al. | ............... | 382/250 |
| 5,530,478 A * | 6/1996 | Sasaki et al. | ........... | 375/240.04 |
| 5,654,704 A * | 8/1997 | Tayama | ........................ | 341/67 |
| 6,009,192 A * | 12/1999 | Klassen et al. | ............... | 382/167 |
| 6,097,838 A * | 8/2000 | Klassen et al. | ............... | 382/167 |
| 6,211,864 B1 * | 4/2001 | Redford | ....................... | 345/543 |
| 6,292,589 B1 * | 9/2001 | Chow et al. | .................. | 382/239 |
| 6,324,216 B1 * | 11/2001 | Igarashi et al. | ......... | 375/240.14 |
| 6,597,363 B1 * | 7/2003 | Duluk et al. | ................. | 345/506 |
| 6,999,511 B1 * | 2/2006 | Boice et al. | .................. | 375/240 |
| 7,079,697 B2 * | 7/2006 | Zhou | .......................... | 382/250 |
| 7,142,235 B2 * | 11/2006 | Herley | ..................... | 348/231.2 |
| 7,167,181 B2 * | 1/2007 | Duluk et al. | ................. | 345/506 |
| 2001/0017946 A1 * | 8/2001 | Klassen | ....................... | 382/296 |
| 2004/0013202 A1 * | 1/2004 | Lainema | ................ | 375/240.18 |
| 2004/0101056 A1 * | 5/2004 | Wong et al. | ............ | 375/240.25 |
| 2004/0174998 A1 * | 9/2004 | Youatt et al. | ................. | 380/210 |
| 2004/0190785 A1 * | 9/2004 | Sun et al. | ...................... | 382/250 |
| 2006/0153467 A1 * | 7/2006 | Staelin | ......................... | 382/250 |
| 2006/0170703 A1 * | 8/2006 | Liao | ........................... | 345/613 |
| 2006/0181549 A1 * | 8/2006 | Alkouh | ........................ | 345/629 |
| 2006/0204119 A1 * | 9/2006 | Feng et al. | ................... | 382/250 |
| 2007/0296613 A1 * | 12/2007 | Hussain et al. | ................ | 341/50 |
| 2007/0297501 A1 * | 12/2007 | Hussain et al. | .............. | 375/240 |

OTHER PUBLICATIONS

Litchtenbelt, B. "Open GL Shading Language Specification" May 14, 2004; 3D Labs, Inc. Author Revison 0.79, pp. 1-23.*

(Continued)

Primary Examiner—Bhavesh M Mehta
Assistant Examiner—Mia M Thomas
(74) Attorney, Agent, or Firm—Woodcock Washburn LLP

(57) ABSTRACT

The discrete cosine transform (DCT) is mapped to a graphics processing unit (GPU) instead of a central processing unit (CPU). The DCT can be implemented using a shader-based process or a host-based process. A matrix is applied to a set of pixel samples. The samples are processed in either rows or columns first, and then the processing is performed in the opposite direction. The number of times a shader program is changed is minimized by processing all samples that use a particular shader (e.g., the first shader) at the same time (e.g., in sequence).

19 Claims, 8 Drawing Sheets

OTHER PUBLICATIONS

Whitted T. and Weimer D. "A Software Tesbed for the Development of 3D Raster Graphics Systems" Jan. 1982, ACM Transactions on Graphics (TOG), New York, NY, USA vol. 1, Issue 1, pp. 43-58.*

Segal M., Akeley K., Frazier, C., Leech, J., Brown P. "The Open GL Graphics System: A Specification" Version 2.1 Jul. 30, 2006.103 pages.*

Gould, D. "Glossary—Computer Graphics and Maya Programming", pp. 1-11.*

Fuchs et al. "Pixel Planes 5: A Heterogeneous Multiprocessor Graphics System Using Processor Enhanced Memories" ACM computer GRaphics, vol. 23, No. 3, Jul. 1989, pp. 79-88.*

Owens et al. "Media Processing Applications on the Imagine Stream Processor" IEEE 2002 International Conference on Computer Design: VLSI in Computers and Processors, pp. 1-8.*

Arman, Farshid, et al., "Image Processing On Compressed Data For Large Video Databases," *Proceedings of the first ACM International Conference on Multimedia,* Sep. 1993, pp. 1-6.

Kalavade, Asawaree, et al., "Hardware/Software Partitioning for Multi-function Systems," *IEEE,* 1997, pp. 516-521.

Rosa, Gabriel G., et al., "An Interactive Volume Visualization System for Transient Flow Analysis," *Proceedings of the 2003 Eurographics/IEEE TVCG Workshop on Volume graphics,* Jul. 2003, pp. 137-144.

Saha, Subhasis, "Image Compression—from DCT to Wavelets: A Review," http://www.acm.org/crossroads/xrds6-3/sahaimgcoding.html, 2000, 25 pages.

Shen, Guobin, et al., "Accelerating Video Decoding Using GPU," *IEEE,* 2003, pp. IV-772-IV-775.

Shi, Changgui, et al., "A Fast MPEG Video Encryption Algorithm," *Proceedings of the sixth ACM international conference on Multimedia,* Sep. 1993, pp. 81-88.

Sijstermans, Frans, et al. "CD-I Full-Motion Video Encoding on a Parallel Computer," *Communications of the ACM,* Apr. 1991, vol. 34, Issue 4, pp. 82-91.

Sloan, Peter-Pike, et al., "Clustered Principal Components for Precomputed Radiance Transfer," *ACM Transactions on Graphics (TOG),* Jul. 2003, vol. 22, Issue 3, pp. 382-391.

* cited by examiner

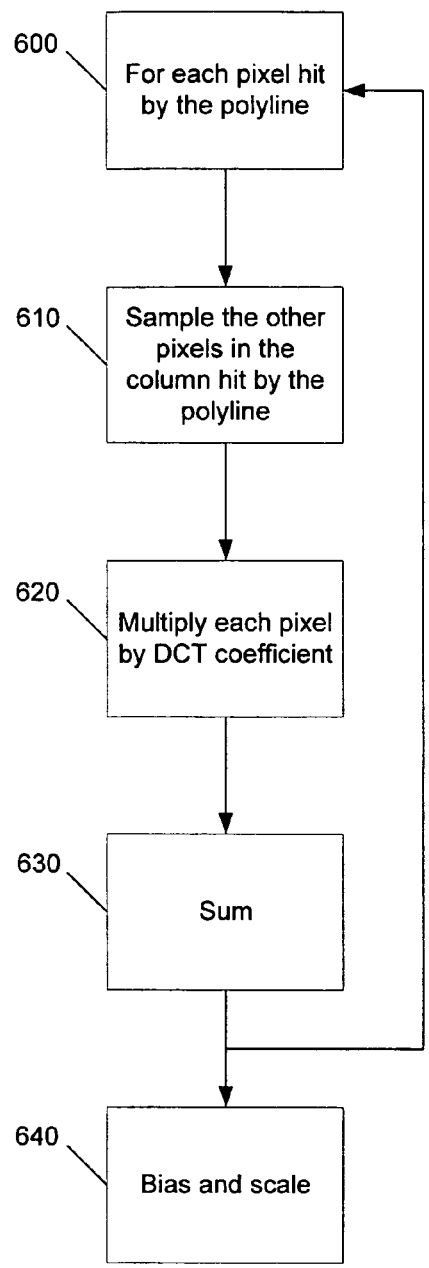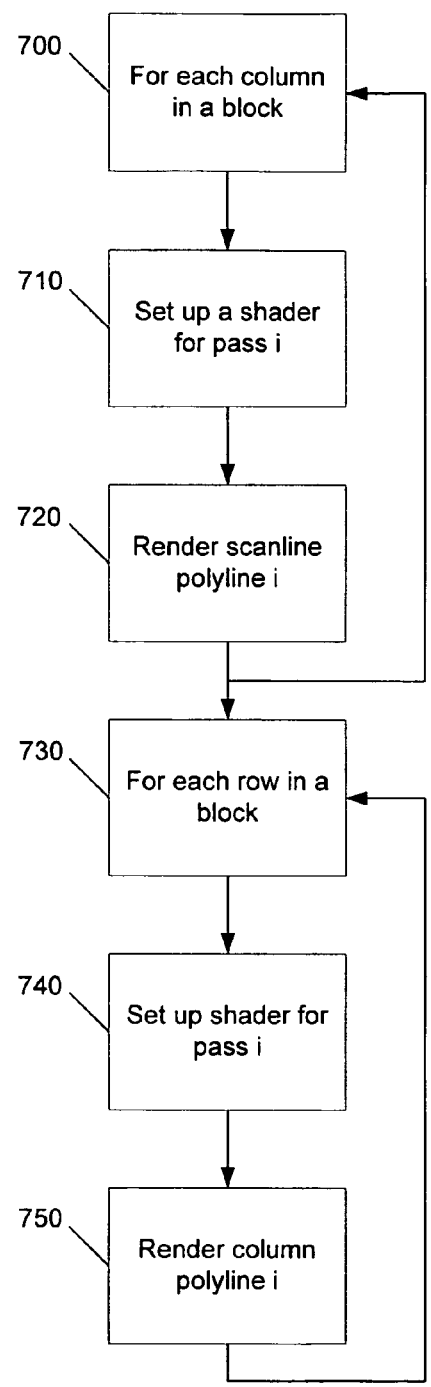
Fig. 8
Fig. 9

IMPLEMENTATION OF DISCRETE COSINE TRANSFORMATION AND ITS INVERSE ON PROGRAMMABLE GRAPHICS PROCESSOR

FIELD OF THE INVENTION

This invention relates in general to the field of computer processing. More particularly, this invention relates to the use of a graphics processing unit to accelerate graphics and non-graphics operations.

BACKGROUND OF THE INVENTION

For still image compression, the Joint Photographic Experts Group (JPEG) standard has been established by ISO (International Standards Organization) and IEC (International Electro-Technical Commission). The performance of coders in accordance with this standard generally degrades at low bit-rates mainly because of the underlying block-based Discrete Cosine Transform (DCT) scheme.

A typical lossy image compression system (lossy signal/image encoder) is shown in FIG. 1 and comprises a source encoder 10, a quantizer 20, and an entropy encoder 30. Compression is accomplished by applying a linear transform to decorrelate the image data, quantizing the resulting transform coefficients, and entropy coding the quantized values.

For the source encoder 10, a variety of linear transforms have been developed which include Discrete Fourier Transform (DFT), Discrete Cosine Transform (DCT), Discrete Wavelet Transform (DWT), for example.

The quantizer 20 reduces the number of bits needed to store the transformed coefficients by reducing the precision of those values. Because this is a many-to-one mapping, it is a lossy process and is the main source of compression in an encoder. Quantization can be performed on each individual coefficient, which is known as scalar quantization. Quantization can also be performed on a group of coefficients together, and is known as vector quantization. Both uniform and non-uniform quantizers can be used depending on the particular problem.

The entropy encoder 30 further compresses the quantized values losslessly to give better overall compression. It uses a model to accurately determine the probabilities for each quantized value and produces an appropriate code based on these probabilities so that the resultant output code stream will be smaller than the input stream. The most commonly used entropy encoders are the Huffman encoder and the arithmetic encoder, although for applications requiring fast execution, simple run-length encoding (RLE) has been used.

The idea of compressing an image is not new. The discovery of DCT in 1974 is an important achievement for the research community working on image compression. The DCT can be regarded as a discrete-time version of the Fourier-Cosine series. It is a close relative of DFT, a technique for converting a signal into elementary frequency components. Thus DCT can be computed with a Fast Fourier Transform (FFT) like algorithm in O(n log n) operations. Unlike DFT, DCT is real-valued and provides a better approximation of a signal with fewer coefficients.

FIGS. 2 and 3 show in more detail the components in a typical DCT-based encoder and decoder, respectively, for grayscale images. Color image compression can be approximately regarded as compression of multiple grayscale images, which are either compressed entirely one at a time, or are compressed by alternately interleaving 8×8 sample blocks from each in turn.

The DCT-based encoder 100 shown in FIG. 2 can be thought of as compressing a stream of 8×8 blocks of image samples 90. Each 8×8 block makes its way through each processing step/component, and yields output in compressed form into the data stream. The 8×8 blocks are provided to a forward DCT (FDCT) processor 105. Because adjacent image pixels are highly correlated, the FDCT processing lays the foundation for achieving data compression by concentrating most of the signal in the lower spatial frequencies. The sample is then passed to a quantizer 110 (similar to the quantizer 20 in FIG. 1), which uses a quantizer table 120. The results of the quantizer 110 are provided to an entropy encoder 115 (similar to the entropy encoder 30 in FIG. 1) which, in conjunction with a Huffman table 125, provides the output of compressed image data.

For a typical 8×8 sample block from a typical source image, most of the spatial frequencies have zero or near-zero amplitude and need not be encoded. In principle, the DCT introduces no loss to the source image samples; it merely transforms them to a domain in which they can be more efficiently encoded.

The decoder 200 of FIG. 3 performs the opposite functions of those of the encoder 100 of FIG. 2. The compressed image data is provided to an entropy decoder 205, which provides its output to a dequantizer 210 and then to an inverse DCT (IDCT) processor 215. A quantizer table 220 and a Huffman table 225 are also used in the reconstruction of the image 299.

Current computer systems are being designed with increasingly sophisticated graphics systems. These systems often have extremely powerful programmable graphics processing units (GPU) to perform sophisticated graphics functions. Currently, however, certain commonly used graphics primitives are not well suited to implementation GPUs. One such function is the DCT and its inverse, which still run in the central processing unit (CPU). The DCT is a very expensive operation. Moreover, when real-time multimedia applications are implemented on a general purpose computer, the CPU is usually heavily loaded and in many cases the CPU alone cannot meet the real-time requirement. Oftentimes, the GPU is idle while the CPU is heavily loaded. It would be desirable to take advantage of the GPU's power in certain situations and applications.

In view of the foregoing, there is a need for systems and methods that overcome the limitations and drawbacks of the prior art.

SUMMARY OF THE INVENTION

The present invention is directed to implementations of a discrete cosine transform (DCT) suitable for running in a graphics processing unit (GPU) instead of a central processing unit (CPU). The DCT is mapped to the GPU. The DCT can be implemented using a shader-based process or a host-based process. A matrix is applied to a set of pixel samples. The samples are processed in either rows or columns first, and then the processing is performed in the opposite direction. The number of times a shader program is changed is minimized by processing all samples that use a particular shader (e.g., the first shader) at the same time (e.g., in sequence).

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 8 is a flow diagram of an exemplary shader-based method in accordance with the present invention;

FIG. 9 is a flow diagram of an exemplary host-based method in accordance with the present invention.

DETAILED DESCRIPTION OF PREFERRED EMBODIMENTS

Figure 1:
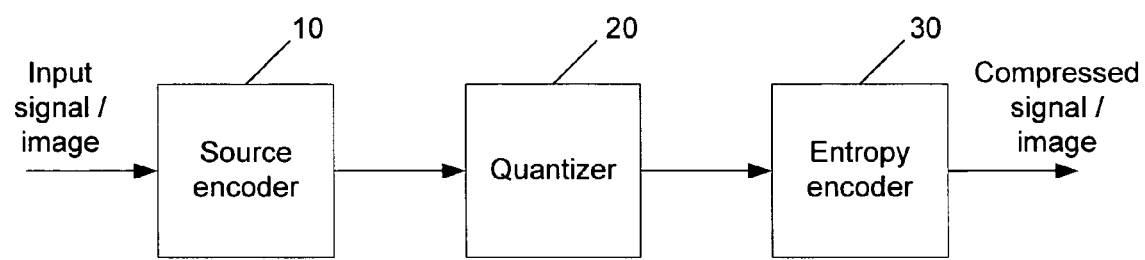
FIG. 1 is a block diagram of a typical lossy image compression.
Figure 2:
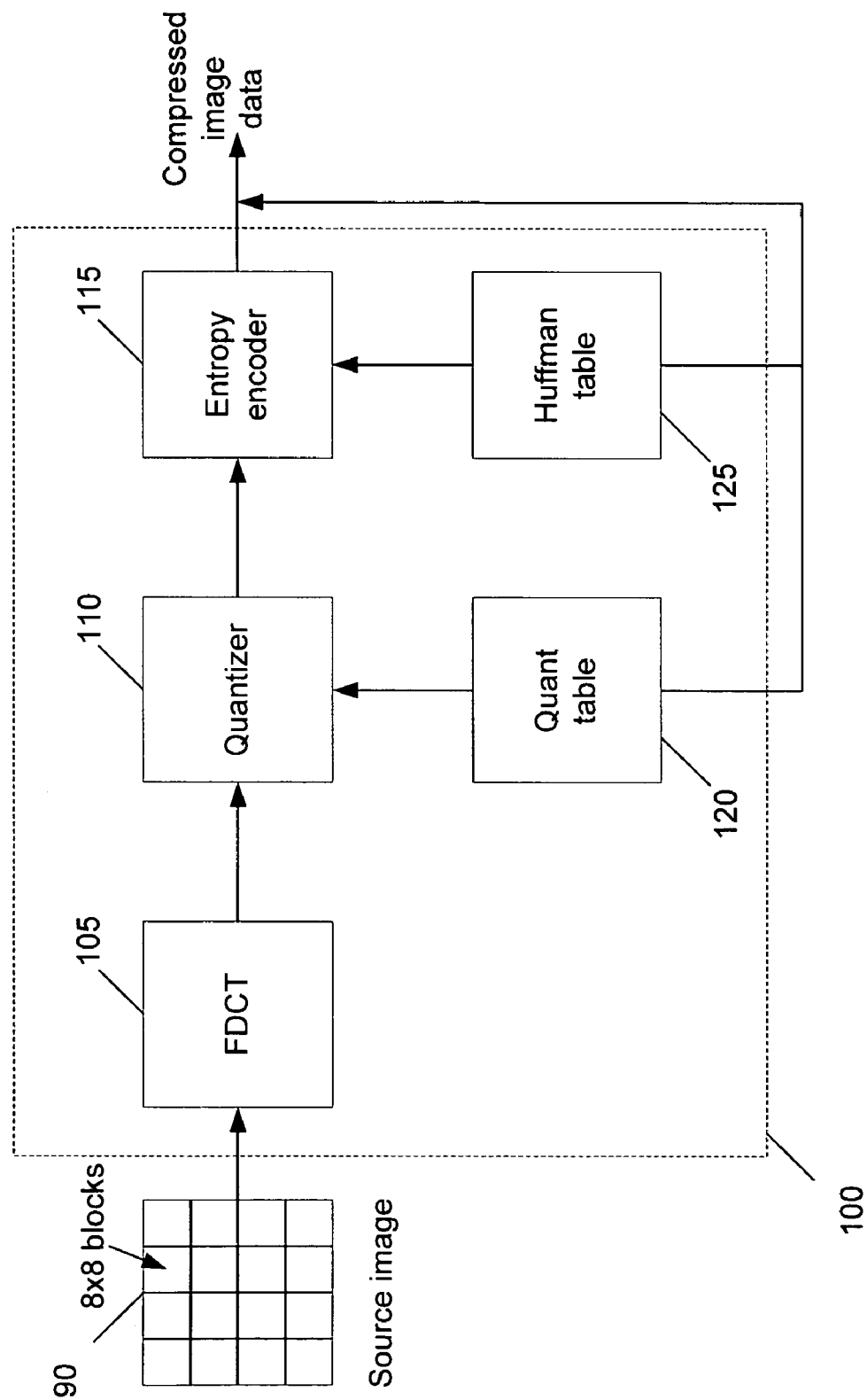
FIG. 2 is a block diagram of a conventional DCT-based encoder.
Figure 3:
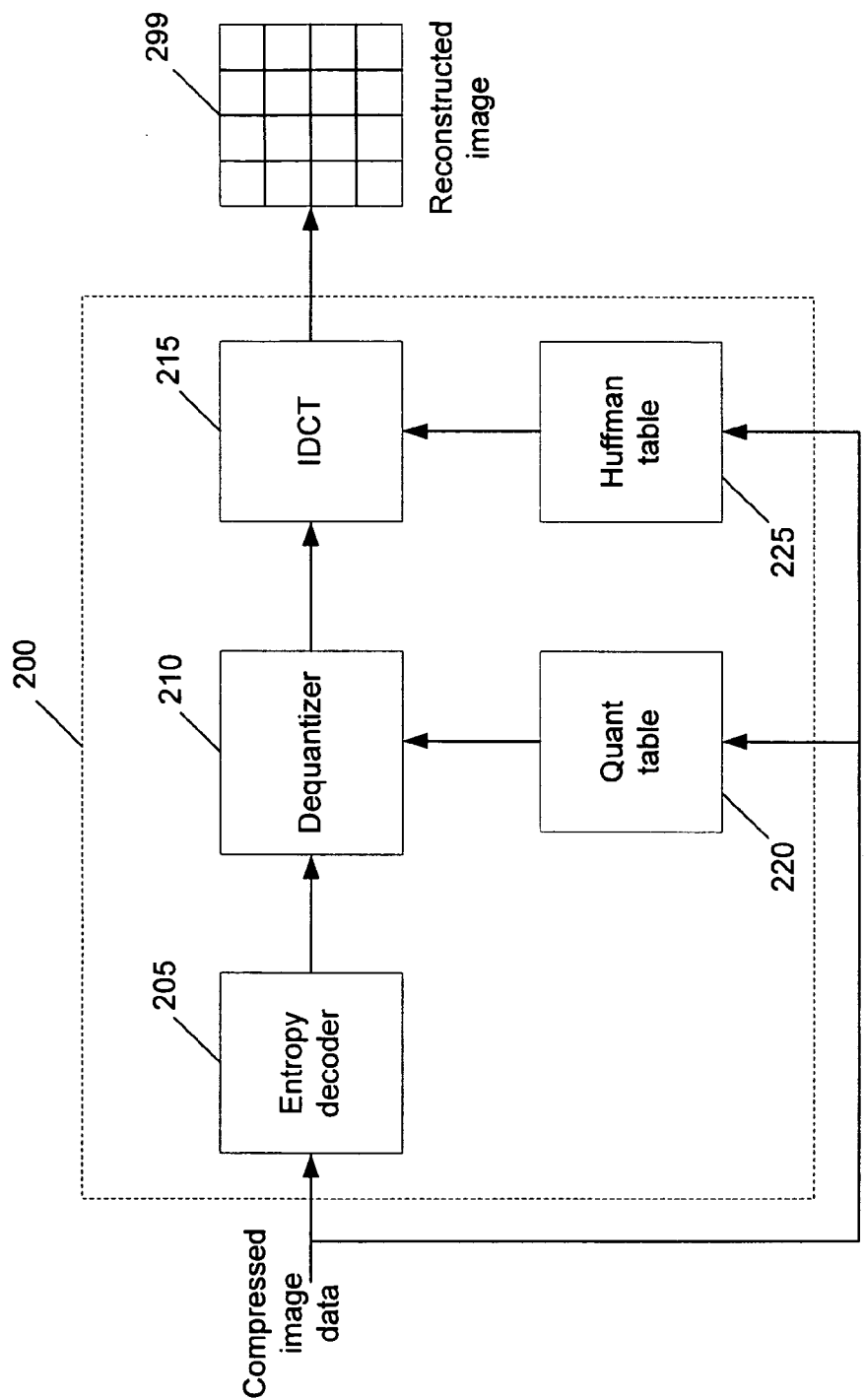
FIG. 3 is a block diagram of a conventional DCT-based decoder.
Figure 4:
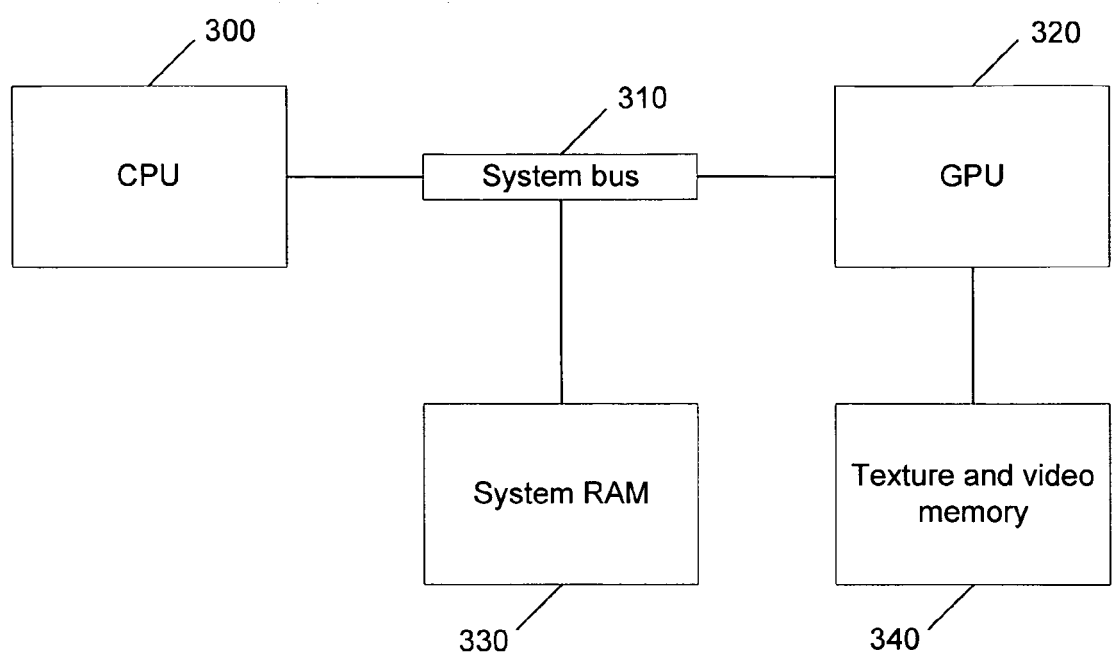
FIG. 4 is a block diagram of an exemplary CPU/GPU system in accordance with the present invention.

FIG. 4 is a block of an exemplary system that may be used in accordance with the present invention in which the DCT is mapped to the GPU 320 instead of the CPU 300. A system bus 310 with system RAM 330 reside between the CPU 300 and the GPU 320. The system bus 310 may be implemented or embedded in a set of chips, for example. The chipset preferably supports the system bus internally or exposes it externally. PCI and AGP are examples of busses that may be used in accordance with the present invention to connect the GPU 320 to the chipset, and therefore to the CPU 300. The GPU 320 has associated texture and video memory 340. The processing involving the DCT, set forth below, takes place within the GPU 320.

According to an exemplary embodiment, an image or picture is broken into 8×8 blocks of pixels. Each block of pixels (in an 8×8 block) is then run through the DCT process, as set forth below, on the GPU 320.

Although most conventional implementations of the DCT use a linear program, the DCT can also be described as applying a matrix $C^{11}_8$ to a set of samples. The elements of the matrix $[C^{11}_8]_{mn}$ (m and n 0.7) are defined as sqrt(2.0/8.0)* $k_m$*cos (m*(n+0.5)*pi/8.0) where $k_m$ is 1.0/sqrt(2.0) if m is 0 and 1.0 otherwise. For columns of pixels, for each 8×8 pixel block, a column of pixels P0 ... P7 is multiplied with an 8×8 matrix $C^{11}_8$, as shown below. Alternatively, each resulting pixel is the result of a dot product of the column of 8 pixels and one row of the DCT matrix.

$$\begin{array}{c} P0 \\ P1 \\ P2 \\ P3 \\ P4 \\ P5 \\ P6 \\ P7 \end{array} * C^{||}_8 = \begin{array}{c} T0 \\ T1 \\ T2 \\ T3 \\ T4 \\ T5 \\ T6 \\ T7 \end{array}$$

The result of the above column/matrix multiplication can be viewed as eight sets of pixels, T0 ... T7. Thus, for example, each pixel in the T0 set results from the same computation; that is, each pixel in a resultant T set of pixels is generated by multiplying the 8 input pixels P0 ... P7 in the same column by the proper element of the $C^{11}_8$ matrix.

The following is a description of an exemplary technique for sampling columns of pixels to generate a 1D DCT. To complete the 2D DCT, a similar technique is applied, swapping columns for scanlines and vice versa. Because the transform matrix is orthogonal, to find the IDCT, the same transform is desirably applied with the transpose of the matrix.

Figure 5:
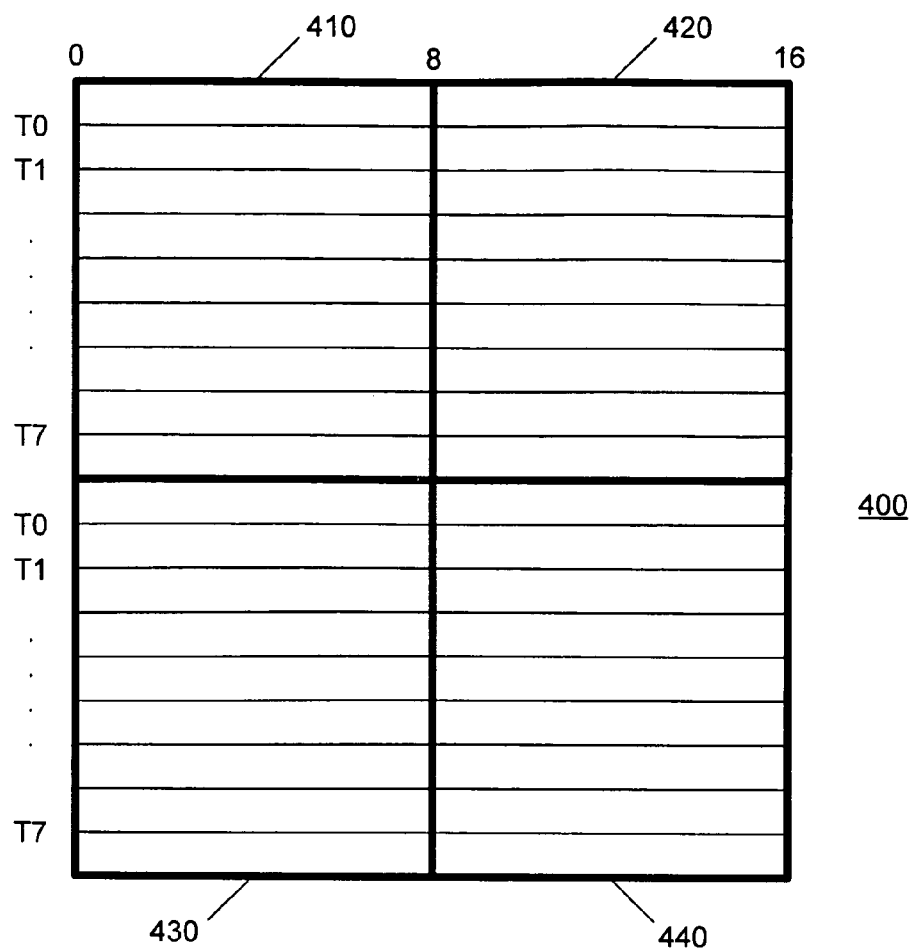
FIG. 5 is a diagram of exemplary blocks useful in describing the present invention.

The pixel sets T0 ... T7 correspond to textured lines across pixels in the 8×8 blocks of pixels. Such lines are shown in FIG. 5 as lines T0 ... T7 across pixels in each of the 8×8 blocks 410, 420, 430, 440. Thus, eight sets of textured lines are created (T0 ... T7), one set for each set of scanlines, S0 ... S7, shown in FIG. 6, and described further below. These sets of textured lines T0 ... T7 correspond to the appropriate row in each block 410, 420, 430, 440, and are used to determine the scanlines S0 ... S7 for subsequent processing.

For each set of scanlines S0 ... S7, a separate shader is used to sample the correct pixels from the source texture and multiply them with the correct row of the matrix $C^{11}_8$.

To facilitate defining the scanlines such that the input image is sampled correctly, pre-transformed coordinates are used, and lines are drawn from 0 to the width of the source image. For the four 8×8 block example shown in FIG. 5, the X coordinates of each line should run from 0 and 16. The X value of the pixel (or texture) coordinates desirably have one half a pixel width added to them to ensure sampling at the center of the pixel: 1.0/width/2.0, making the coordinate of the part of the line that hangs off the left edge greater than 1. The technique desirably is set to avoid drawing past the end of the image. Y values are likewise incremented by half the pixel height.

Figure 6:
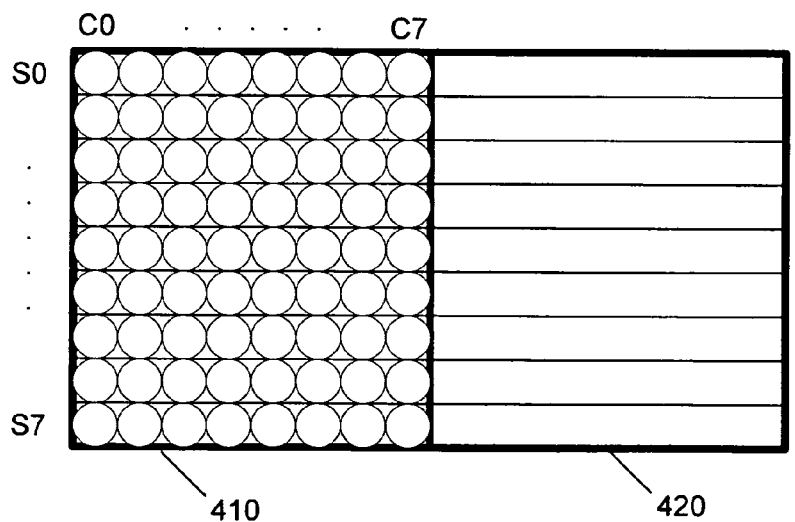
FIG. 6 is a diagram of an exemplary block showing pixels useful in describing the present invention.

An array of texture or pixel coordinate offsets to neighboring pixels is defined, allowing the shader to add the appropriate offset to the current coordinate for use in a dependent read to sample the pixels in the column. In FIG. 6, when processing the scanline S0 to create the value for the first pixel (in column C0), the shader accesses the pixels in column C0 using the offset array, and multiplies them by the appropriate matrix values. The same shader can be used for the each of the other pixels in scanline S0, each of which access pixels in the same column C0. To process the row S1, a different shader is loaded to insure that the correct matrix values and array offsets are used to process the pixels in column C0.

Thus, the results for a column of pixels (e.g., C0) is determined by processing all of the columns in parallel. Each line T0 ... T7 represents a row of output pixels determined from the column. The shaders are used to sample the pixels in the column. Thus, a shader is used to determine the output pixel S0 in the column C0, and another shader for pixel S1 in column C0, etc. Arranging these output values as horizontal textured lines allows the technique to process all columns in all S0 scanlines in all 8×8 blocks in the source images in parallel.

Therefore, in the GPU, depending on which value of T0 ... T7 is desired, a different set of constants and different set of offsets into the original 8×8 block P0 ... P7 and the 8×8 constant matrix $C^{11}_8$ are used. At this time, instead of just doing one operation, all eight operations are done in sequence. This minimizes the number of times a shader program is changed. Changing programs is a relatively expensive operation. So the pixel in column C0, first row, for example, in every 8×8 block is determined when the $0^{th}$ shader program has been loaded. Subsequently, all the pixels in column C0 in each 8×8 block are determined. In this way, all the pixels that use the $0^{th}$ shader are determined with the $0^{th}$ shader only having to be loaded one time initially. Then, for example, all the pixels in each 8×8 block that use the $1^{st}$ shader are determined. Thus, to determine all the pixels in every 8×8 block for example, the shader program is only changed 8 times, not more often which would be the case, for example, if each 8×8 block was processed separately, in sequence. This parallelism is allowed by processing one eighth of the output values as one primitive.

It is noted that the number of operations (i.e., times a shader program is to be changed) is related to the size of the blocks (e.g., 8 times for 8×8 blocks). It is contemplated that the present invention can be implemented on any system having parallel architecture and/or any stream processor.

Thus, as set forth above, the exemplary embodiments use the matrix version of the DCT, and reload the shader multiple times. The IDCT applies the same operation using the transposed matrix. The 2D DCT (and the IDCT) used for video compression is separable, meaning that one can apply a transform to a set of rows of the source, and then to the columns of the result. A separable filter may be provided so that a set of 1D operations can be performed in a first direction (e.g., rows) and then a set of 1D operations can be performed in a second direction (e.g., columns).

Figure 7:
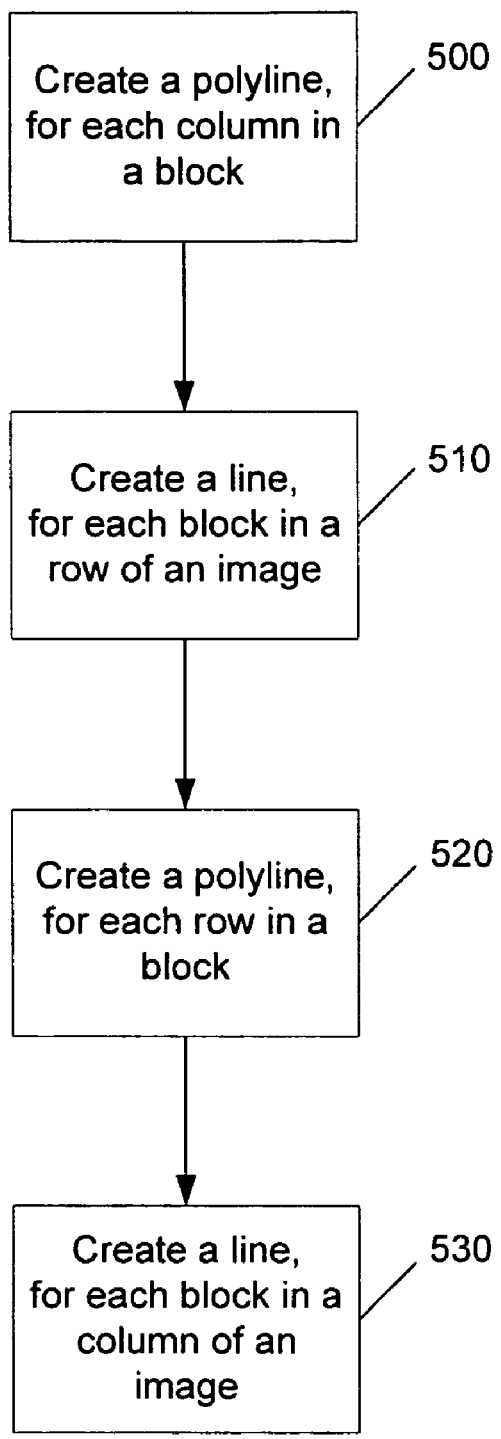
FIG. 7 is a flow diagram of an exemplary method of processing pixels in accordance with the present invention.

FIG. 7 is a flow diagram of an exemplary method of processing pixels in accordance with the present invention. The columns are processed first, and then the rows are processed. At step 500, a polyline of pixels, P0 . . . P7 is created for each column in a block of pixels (i.e., here, for example, eight polylines are created, one for each column). At step 510, a line T0 . . . T7 is created for each row in the block, using an exemplary technique such as that set forth above. The rows for which the lines are created are the polylines from step 500.

After the first direction has been processed, then the second direction is processed. At step 520, a polyline of pixels, P0 . . . P7 is created for each row in a block of pixels. A line T0 . . . T7 is then created for each column in the block, at step 530, using a similar technique to that described above. The columns for which the lines are created are the polylines from step 520.

The results of the DCT are signed and can be outside the range 0 . . . 1. When this is scaled to fit within an integer texture, the results are desirably scaled and biased to fall between 0 and 1 to avoid data loss. For the IDCT, this bias and scale is desirably undone before the matrix is applied.

FIG. 8 is a flow diagram of an exemplary shader-based method in accordance with the present invention. For each pixel in the polyline (e.g., P0 . . . P7), which is determined at step 600, the other pixels in the column that lie along the polyline are sampled (step 610) and multiplied by the appropriate DCT coefficient in the matrix (step 620). Each of these resultant values are added together at step 630, and the process repeats along each pixel in the polyline. After each pixel in the polyline has been processed, the resulting values are biased and scaled, at step 640.

The inventors have determined that, using current technology, the above operations can take 34 instructions in the GPU for the DCT, and as many as 49 instructions for the IDCT. The IDCT is longer because the scale and bias is reversed for each source pixel, as opposed to only being applied once on the destination.

Exemplary HLSL (High Level Shading Language) source code for the DCT operation for one column is provided as follows, where "offsets" is an array containing the offset to the appropriate texture coordinate, and "rowNumber" is the row within an 8×8 block that is the destination pixel.

```
float4 DCTColumn(
        in float2 sourceTextureCoord,
        in int rowNumber)
{
        float4 color = 0;
        float2 tc = sourceTextureCoord;
        tc.y = sourceTextureCoord.y + offsets[7 – rowNumber].y;
    color += tex2D(sourceTextureSampler, tc) * DCTCoefficients[2*rowNumber].x;
        tc.y = sourceTextureCoord.y + offsets[8 – rowNumber].y;
    color += tex2D(sourceTextureSampler, tc) * DCTCoefficients[2*rowNumber].y;
        tc.y = sourceTextureCoord.y + offsets[9 – rowNumber].y;
    color += tex2D(sourceTextureSampler, tc) * DCTCoefficients[2*rowNumber].z;
        tc.y = sourceTextureCoord.y + offsets[10 – rowNumber].y;
    color += tex2D(sourceTextureSampler, tc) * DCTCoefficients[2*rowNumber].w;
        tc.y = sourceTextureCoord.y + offsets[11 – rowNumber].y;
    color += tex2D(sourceTextureSampler, tc) * DCTCoefficients[2*rowNumber+1].x;
        tc.y = sourceTextureCoord.y + offsets[12 – rowNumber].y;
    color += tex2D(sourceTextureSampler, tc) * DCTCoefficients[2*rowNumber+1].y;
        tc.y = sourceTextureCoord.y + offsets[13 – rowNumber].y;
    color += tex2D(sourceTextureSampler, tc) * DCTCoefficients[2*rowNumber+1].z;
        tc.y = sourceTextureCoord.y + offsets[14 – rowNumber].y;
    color += tex2D(sourceTextureSampler, tc) * DCTCoefficients[2*rowNumber+1].w;
        color *= .125;
        color += .5;
        return (color);
}
```

This technique may be optimized by moving the offset texture calculations out of the pixel shader. This operation could be performed either in the vertex shader or on the host processor by creating a vertex representation that contains a texture coordinate for each input pixel to be sampled (e.g., in this case, eight texture coordinates). Host calculation is more efficient because these offsets need be calculated only once, as opposed to once per frame as it would be if the vertex shader were used.

FIG. 9 is a flow diagram of an exemplary host-based method in accordance with the present invention. For each column in a block of pixels, as determined at step 700, a shader is set up for a particular pass (e.g., pass i, where i is the pass number from 1 to the number of columns), at step 710. The associated scanline is rendered at step 720. Then, for each row in a block of pixels, as determined at step 730, a shader is set up for a particular pass, at step 740. The associated column is then rendered at step 750.

Using an exemplary host calculation technique, the DCT takes 18 instructions (8 texture and 10 arithmetic) as opposed to 34. The IDCT takes 25 instructions (8 texture and 17 arithmetic) as opposed to 49. Note that an additional optimization can be applied in which the matrix $C^{11}{}_8$ is added as constants to the source file, as opposed to being loaded from the host. This allows the HLSL compiler to combine the inversion of the scale with the multiplications used for the matrix processing, and saves 8 IDCT instructions.

Exemplary HLSL source code for the DCT of one column is provided as follows:

tems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

Figure 10:
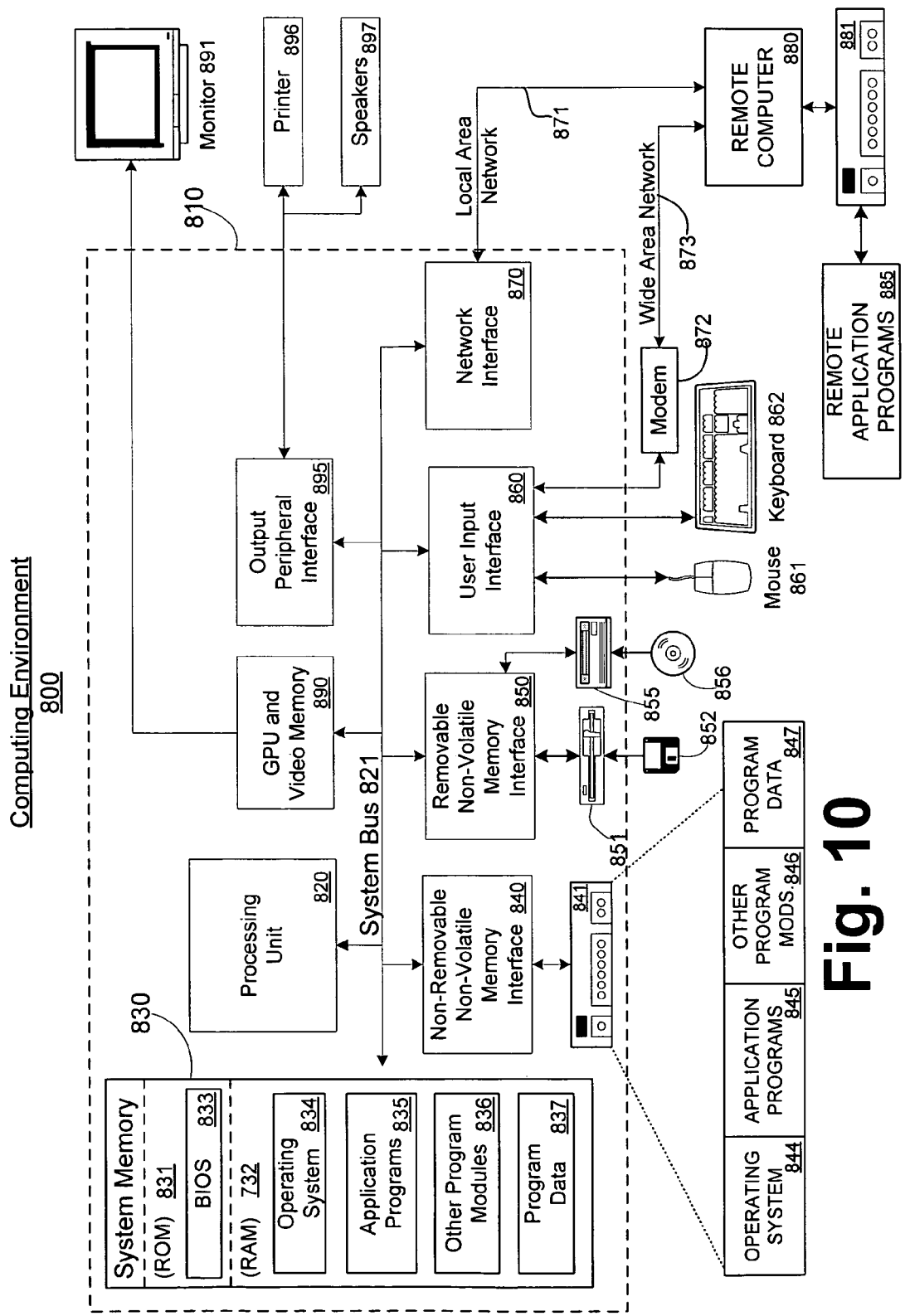
FIG. 10 is a block diagram showing an exemplary computing environment in which aspects of the invention may be implemented.

With reference to FIG. 10, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory

```
float4 DCT(
    in float2 tc0,
    in float2 tc1,
    in float2 tc2,
    in float2 tc3,
    in float2 tc4,
    in float2 tc5,
    in float2 tc6,
    in float2 tc7,
    in int rowNumber)
{
    float4 color = 0;
    color += tex2D(sourceTextureSampler, tc0) * DCTCoefficients[2*rowNumber].x;
    color += tex2D(sourceTextureSampler, tc1) * DCTCoefficients[2*rowNumber].y;
    color += tex2D(sourceTextureSampler, tc2) * DCTCoefficients[2*rowNumber].z;
    color += tex2D(sourceTextureSampler, tc3) * DCTCoefficients[2*rowNumber].w;
    color += tex2D(sourceTextureSampler, tc4) * DCTCoefficients[2*rowNumber+1].x;
    color += tex2D(sourceTextureSampler, tc5) * DCTCoefficients[2*rowNumber+1].y;
    color += tex2D(sourceTextureSampler, tc6) * DCTCoefficients[2*rowNumber+1].z;
    color += tex2D(sourceTextureSampler, tc7) * DCTCoefficients[2*rowNumber+1].w;
    color *= .125;
    color += .5;
    return (color);
}
```

Exemplary Computing Environment

FIG. 10 illustrates an example of a suitable computing system environment 800 in which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing sysbus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or non-volatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable, volatile/non-volatile computer storage media. By way of example only, FIG. 10 illustrates a hard disk drive 840 that reads from or writes to non-removable, non-volatile magnetic media, a magnetic disk drive 851 that reads from or writes to a removable, non-volatile magnetic disk 852, and an optical disk drive 855 that reads from or writes to a removable, non-volatile optical disk 856, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface, which may comprise a graphics processing unit (GPU) and video memory 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 10. The logical connections depicted include a LAN 871 and a WAN 873, but may also include other networks. Such networking environments are commonplace in offices, enterprise-wide computer networks, intranets and the internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on memory device 881. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A method of implementing a DCT in a GPU, comprising:
separating an image into blocks of pixels;
loading a shader module into GPU memory and activating the shader module;
associating a pre-determined group of pixels in each block of pixels with the active shader module;
processing each of the associated pre-determined groups of pixels in each block of pixels, in parallel, within the active shader module prior to changing active status to another shader module, the processing comprising:
multiplying a column or row of pixels with a predetermined matrix to generate a corresponding set of output pixels;
determining sets of scanlines based on the corresponding sets of output pixels; and
for each set of scanlines, sampling at least a portion of the pixels comprised within the scanlines and pixels relative to the scanlines for every block of pixels, and multiplying the sampled pixels with a row or column of the predetermined matrix,
wherein said multiplying, said determining, and said sampling of the pixels is performed by said active shader module.

2. The method of claim 1, wherein the said multiplying, said determining, and said sampling of the pixels is performed in the GPU.

3. The method of claim 1, wherein each corresponding set of output pixels corresponds to a textured line across the pixels in the blocks of pixels.

4. The method of claim 1, wherein said sampling at least a portion of the pixels comprised within the scanlines comprises using a separate shade for each set of scanlines.

5. The method of claim 4, further comprising defining an array of coordinate offsets to neighboring pixels, wherein the shader module accesses the pixels in the scanlines using the offset array.

6. A method of processing pixels, comprising;
separating an image into blocks of pixels, and associating a pre-determined group of pixels in each block of pixels with an active shader module;
processing each associated pixel in every block of pixels within the active shader module prior to changing active status to another shader module, the processing comprising:
creating a polyline of pixels for each column or row in each block of pixels; and
creating a line for each row or column in each block of pixels, wherein the rows or columns correspond to the polylines created for each column or row; and
wherein said creating a polyline of pixels for each column or row in each block of pixels and said creating a line for each row or column in each block of pixels, performed by said active shader module.

7. The method of claim 6, further comprising:
Creating a polyline of pixels for each row or column in each block of pixels; and
Creating a line for each column or row in each block of pixels, wherein the rows or columns correspond to the polylines created for each row or column.

8. The method of claim 6, further comprising:
determining sets of scanlines based on the lines created for each row or column in each block of pixels; and
for each set of scanlines, sampling the pixels comprised within the scanlines and multiplying the sampled pixels with a row or column of a predetermined matrix.

9. The method of claim 6, wherein the step of creating a polyline of pixels for each column or row in each block of pixels and creating a line for each row or column in ach block of pixels is performed in a GPU.

10. A method of processing pixels, comprising:
separating an image into blocks of pixels, and associating a pre-determined group of pixels in each block of pixels with an active shader module;
processing each associated pixel in every block of pixels within the active shader module prior to changing active status to another shader module, the processing comprising:
determining a polyline of pixels for each column or row in each block of pixels;
for each pixel in the polyline,
sampling at least a portion of the other pixels in the corresponding column or row that lies along the polyline and pixels relative to the column or row;
multiplying each of the other pixels by a DCT coefficient from a predetermined matrix to generate resultant values; and
adding the generated resultant values together to generate a second resulting value,
wherein said multiplying and said adding is performed by said active shader module.

11. The method of claim 10, further comprising biasing and scaling at least one of the polyline of pixels, the generated resultant values, and each of said second resulting values for each pixel.

12. A method of processing pixels comprising:
separating an image into blocks of pixels, and associating a pre-determined group of pixels in each block of pixels with an active shader module;
processing each associated pixel in every block of pixels within the active shader module prior to changing active status to another shader module, the processing comprising:

for each column in a block of pixels, setting up a shader module and rendering a scanline; and for each row in a block of pixels, setting up a shader module and rendering a column; and wherein setting up the shader module and rendering the scanline and the column are performed by said active shader module.

13. The method of claim 12, wherein setting up the shader module and the rendering are performed in the GPU.

14. A system to program a GPU to implement a DCT, comprising:

adapting a processing unit to receive blocks of pixels into which an image has been separated, associating a pre-determined group of pixels in each block of pixels with an active shader module, and processing each block of pixels, in parallel, within the active shader module prior to changing active status to another shader module, the processing comprising:

multiplying a column or row of pixels of an image with a predetermined matrix to generate a corresponding set of output pixels;

determining sets of scanlines based on the sets of output pixels; and for each set of scanlines, sampling the pixels comprised within the scanlines and multiplying the sampled pixels with a row or column of the predetermined matrix and wherein said multiplying, said determining, and said sampling of the pixels is performed by said active shader module.

15. The system of claim 14, further comprising a CPU coupled to the GPU by a system bus, the CPU capable of separating the image into the blocks of pixels.

16. The system of claim 14, wherein each corresponding set of output pixels corresponds to a textured line across the pixels in the blocks of pixels.

17. The system of claim 14, wherein the GPU comprises a separate shader module for sampling the pixels comprised within each set of the scanlines.

18. The system of claim 17, wherein the GPU defines an array of coordinate offsets to neighboring pixels, wherein the shader module accesses the pixels in the scanlines using the offset array.

19. A method of implementing low-level video processing in a GPU, comprising:

separating an image into blocks of pixels;

loading a shader module into GPU memory and activating the shader module;

associating a pre-determined group of pixels in each block of pixels with the active shader module;

processing each of the associated groups of pixels in each block of pixels, in parallel, within the active shader module prior to changing active status to another shader module, the processing comprising:

multiplying a column or row of pixels with a predetermined matrix to generate a corresponding set of output pixels;

determining sets of scanlines based on the sets of output pixels; and for each set of scanlines, sampling at least a portion of the pixels comprised within the scanlines and pixels relative to the scanlines for every block of pixels, and multiplying the sampled pixels with a row or column of the predetermined matrix using a separate shader module for each set of scanlines;

defining an array of coordinate offsets to neighboring pixels, wherein the shader module accesses the pixels in the scanlines using the offset array; and wherein said multiplying, said determining, and said sampling or the pixels is performed by said active shader module.

* * * * *